(12) United States Patent
Gao et al.

(10) Patent No.: US 11,234,294 B2
(45) Date of Patent: Jan. 25, 2022

(54) DATA DIMENSION REDUCTION METHOD, APPARATUS, AND SYSTEM, COMPUTER DEVICE, AND STORAGE MEDIUM

(71) Applicant: HUAWEI TECHNOLOGIES CO., LTD., Guangdong (CN)

(72) Inventors: Quanzhong Gao, Shanghai (CN); Heng Xu, Shanghai (CN); Guochen Liu, Shenzhen (CN); Liwei Ge, Shanghai (CN); Jianbiao Xu, Shanghai (CN); Senbao Guo, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 79 days.

(21) Appl. No.: 16/749,103

(22) Filed: Jan. 22, 2020

(65) Prior Publication Data

US 2020/0162940 A1 May 21, 2020

Related U.S. Application Data

(63) Continuation of application No. PCT/CN2017/094908, filed on Jul. 28, 2017.

(51) Int. Cl.
*H04W 88/08* (2009.01)
*H04W 16/28* (2009.01)
(Continued)

(52) U.S. Cl.
CPC ......... *H04W 88/085* (2013.01); *H04W 16/28* (2013.01); *H04W 72/046* (2013.01); *H04W 72/0413* (2013.01); *H04W 72/10* (2013.01)

(58) Field of Classification Search
CPC ........... H04W 88/085; H04W 72/0413; H04W 72/044; H04W 72/046
See application file for complete search history.

(56) References Cited

U.S. PATENT DOCUMENTS

2011/0241939 A1* 10/2011 Maenpa ................. G01S 19/23
342/368
2012/0252366 A1 10/2012 Aoki et al.
(Continued)

FOREIGN PATENT DOCUMENTS

CN 101753181 A 6/2010
CN 102291855 A 12/2011
(Continued)

OTHER PUBLICATIONS

Office Action issued in Chinese Application No. 201780092805.5 dated Dec. 29, 2020, 6 pages.
(Continued)

*Primary Examiner* — Min Jung
(74) *Attorney, Agent, or Firm* — Fish & Richardson P.C.

(57) ABSTRACT

This application provides example data dimension reduction methods, apparatus, and systems, computer devices, and storage mediums, and relates to the communications field. One example method includes receiving an antenna domain received signal, where the antenna domain received signal includes an uplink signal that is received from UE by an array antenna corresponding to an RRS, wherein the antenna domain received signal is a time domain signal, a dimension of the antenna domain received signal is $N_1$, and $N_1$ is an integer greater than 1. A received beam weight is obtained based on channel information of the UE. Dimension reduction is performed on the antenna domain received signal by using the received beam weight to obtain a beam domain received signal, where the beam domain received signal is a frequency domain signal, a dimension of the beam domain received signal is $N_2$, and $0 < N_2 < N_1$.

19 Claims, 9 Drawing Sheets

(51) Int. Cl.
*H04W 72/04* (2009.01)
*H04W 72/10* (2009.01)

(56) References Cited

U.S. PATENT DOCUMENTS

| | | | |
|---|---|---|---|
| 2013/0120191 A1* | 5/2013 | Zhang | H01Q 21/26 |
| | | | 342/377 |
| 2016/0028453 A1* | 1/2016 | Zhou | H04L 1/0606 |
| | | | 375/267 |
| 2017/0237831 A1* | 8/2017 | Yang | H04B 1/66 |
| | | | 370/230 |
| 2018/0138957 A1 | 5/2018 | Wang et al. | |
| 2018/0159611 A1* | 6/2018 | Majmundar | H04L 47/38 |
| 2018/0217838 A1* | 8/2018 | Chen | G06F 9/3016 |
| 2019/0335474 A1* | 10/2019 | Tang | H04L 5/005 |
| 2020/0274558 A1* | 8/2020 | Su | H04B 1/0025 |

FOREIGN PATENT DOCUMENTS

| | | |
|---|---|---|
| CN | 102299735 A | 12/2011 |
| CN | 102801681 A | 11/2012 |
| CN | 103457647 A | 12/2013 |
| CN | 103475613 A | 12/2013 |
| JP | 2014204218 A | 10/2014 |
| WO | 2011074031 A1 | 6/2011 |
| WO | 2017107016 A1 | 6/2017 |

OTHER PUBLICATIONS

Extended European Search Report issued in European Application No. 17919614.2 dated Mar. 27, 2020, 8 pages.
PCT International Search Report and Written Opinion issued in International Application No. PCT/CN2017/094908 dated Apr. 18, 2018, 16 pages (with English translation).

* cited by examiner

DATA DIMENSION REDUCTION METHOD, APPARATUS, AND SYSTEM, COMPUTER DEVICE, AND STORAGE MEDIUM

CROSS-REFERENCE TO RELATED APPLICATIONS

This application is a continuation of International Application No. PCT/CN2017/094908, filed on Jul. 28, 2017, the disclosure of which is hereby incorporated by reference in its entirety.

TECHNICAL FIELD

This application relates to the communications field, and in particular, to a data dimension reduction method, apparatus, and system, a computer device, and a storage medium.

BACKGROUND

With an increase in a new radio bandwidth and a quantity of antennas in a wireless network using a 5th generation (5G) mobile communications technology, a common public radio interface (CPRI) serving as an interface between a baseband unit (BBU) and a radio remote unit (RRU) in the wireless network has an increasingly high bandwidth requirement.

A centralized, cooperative, cloud, and clean-radio access network (C-RAN) architecture has advantages such as rapid network deployment, space saving, easy operation and maintenance, easy inter-site coordination, and easy carrier expansion, and therefore, becomes a mainstream network architecture. In the C-RAN architecture, BBUs are deployed in a centralized manner. In conventional BBU or RRU function division, an RRU transmits, to a BBU by using a CPRI, time domain data (namely, time domain data in an antenna domain) received from each antenna. A geographical distance between the RRU and the BBU may be very long. For example, a plurality of RRUs at a relatively short geographical distance may be usually connected in a star topology. Then, time domain data received by the plurality of RRUs from antennas is aggregated to one optical fiber for transmission. In this case, the plurality of RRUs need to share a CPRI with a specific bandwidth to transmit the time domain data, and the time domain data has a relatively high dimension. An existing optical fiber capacity may not be capable of meeting a requirement of simultaneously transmitting the time domain data received by the plurality of RRUs. Therefore, dimension reduction needs to be performed on the time domain data received by the RRUs from the antennas, to meet a data transmission requirement.

In a related technology, functions of the BBU and the RRU are re-classified by using an interface (eCPRI) between a baseband processing function and a remote radio frequency processing function that are in a base station device in the 5G wireless network, and some processing functions (for example, a function of dimensionally reducing the time domain data in the antenna domain to frequency domain data in a beam domain) of the conventional BBU are transferred to the RRU. Due to function changes relative to the conventional BBU and the conventional RRU, a BBU in the base station device in the 5G wireless network is redefined as a radio cloud center (RCC), and an RRU is redefined as a radio remote system (RRS). In the base station device in the 5G wireless network, the RRS can dimensionally reduce the time domain data in the antenna domain to the frequency domain data in the beam domain. The RRS transmits the frequency domain data to the RCC by using the eCPRI, and the RCC performs channel estimation and channel equalization based on the received frequency domain data.

However, in the related technology, when the RRS dimensionally reduces the time domain data in the antenna domain to the frequency domain data in the beam domain, dimension reduction is performed on the data by using a preset beam domain weight. In this case, data dimension reduction has relatively low flexibility.

SUMMARY

To resolve a problem of relatively low flexibility of data dimension reduction in a related technology, this application provides a data dimension reduction method, apparatus, and system, a computer device, and a storage medium. The technical solutions are as follows:

According to a first aspect, a data dimension reduction method is provided, and is applied to a radio remote system RRS, where the RRS is connected to a radio cloud center RCC by using a common public radio interface eCPRI, and the method includes:

receiving an antenna domain received signal, where the antenna domain received signal includes an uplink signal that is sent by user equipment UE and that is received by an array antenna corresponding to the RRS, the antenna domain received signal is a time domain signal, a dimension of the antenna domain received signal is $N_1$, and $N_1$ is an integer greater than 1;

obtaining a received beam weight, where the received beam weight is determined based on channel information of the UE, and different received beam weights are determined based on different channel information; and performing dimension reduction on the antenna domain received signal by using the received beam weight, to obtain a beam domain received signal, where the beam domain received signal is a frequency domain signal, a dimension of the beam domain received signal is $N_2$, and $0 < N_2 \leq N_1$.

According to the data dimension reduction method provided in this embodiment of the present invention, after receiving the antenna domain received signal, the RRS may determine the received beam weight based on the channel information of the UE, and perform dimension reduction on the received antenna domain received signal by using the received beam weight, to obtain the beam domain received signal. Because the different received beam weights are determined based on the different channel information, beam domain received signals obtained after dimension reduction is performed on different antenna domain received signals may have different dimensions, so that flexibility of data dimension reduction is improved.

It should be noted that dimension reduction is performed on the antenna domain received signal by using the received beam weight, to obtain the beam domain received signal. To be specific, an adaptive received beam is determined by using the received beam weight, and a signal is received by using the adaptive received beam.

In this embodiment of the present invention, according to one aspect, a method for obtaining the received beam weight by the RRS may include:

obtaining the channel information of the UE; and determining the received beam weight based on the channel information of the UE.

Correspondingly, the obtaining a received beam weight includes:

obtaining channel information of each UE based on a periodic sounding reference signal SRS sent to each UE; and determining the received beam weight based on the channel information of each UE.

Alternatively, the obtaining a received beam weight includes:

obtaining channel information of each UE based on a demodulation reference signal DMRS sent to each UE; and determining the received beam weight based on the channel information of each UE, For example, the determining the received beam weight based on the channel information of the UE includes:

determining the received beam weight based on the channel information of the UE and a criterion of maximizing received energy of a target signal.

Specifically, the determining the received beam weight based on the channel information of the UE and a criterion of maximizing received energy of a target signal includes:

determining, based on channel information of all UEs, that a quantity of UEs for which space division multiplexing is used is M, and a channel response matrix in antenna domain is $H=[H_1, H_2, \ldots, H_M]$, where $H_i=N_1 \times L_i$, $L_i$ is a quantity of space division multiplexing layers of $i^{th}$ UE, M is an integer greater than 1, and $N_1$ is a quantity of array antennas corresponding to the RRS; and determining, based on the criterion of maximizing received energy of a target signal, that the received beam weight is $W=[W_1, W_2, \ldots, W_M]^{-1}$, where $$W_i = \frac{1}{\|H_i\|^2} H_i^H,$$

where i is an integer, and $1 \leq i \leq M$.

For example, the received beam weight is an interference whitening weight, and the determining the received beam weight based on the channel information of the UE may alternatively include:

determining, based on channel information of all UEs, that a channel response matrix in antenna domain is $H=[H_1, H_2, \ldots, H_M]$, where M is a quantity of all UEs; and determining, based on the channel response matrix, that the received beam weight is $W=H^H R_{uu}^{-1}$, where $R_{uu}$ is an interference covariance matrix.

According to another aspect, that the RRS obtains the received beam weight may include:

receiving the received beam weight sent by the RCC, where the received beam weight is determined by the RCC based on the channel information of the UE.

It can be learned from the foregoing that the received beam weight obtained by the RRS may be determined by the RRS based on the channel information of the UE, or may be determined by the RCC based on the channel information of the UE and then sent to the RRS.

Further, after the performing dimension reduction on the antenna domain received signal by using the received beam weight, to obtain a beam domain received signal, the method further includes:

supplementing the beam domain received signal with a target received beam signal, to obtain an updated beam domain received signal, where the target received beam signal is a signal received by n supplementary received beams in a preset fixed direction, or the target received beam signal is a signal received by n directional supplementary received beams that are predicted based on a multipath direction of a user channel and a moving direction, and n is a positive integer.

Because the channel is variable, a supplementary received beam is added based on the adaptive received beam, so that robustness of the received beam can be improved.

Predicting the n directional supplementary received beams based on the multipath direction of the user channel and the moving direction may include:

determining that a supplementary beam weight of a received beam whose arrival angle is θ is $$W_\theta = \left[1, e^{-j \cdot 2\pi \cdot \frac{d}{\lambda} \cdot \sin\theta}, \ldots, e^{-j \cdot 2\pi \cdot (N_1-1) \frac{d}{\lambda} \cdot \sin\theta}\right],$$

where d is a distance between the array antennas, λ is a wavelength of the received beam, and $N_1$ is a quantity of array antennas;

determining that a target supplementary beam weight is $W_{supplement}=[W_{\theta^1}, W_{\theta^2}, \ldots, W_{\theta^n}]^{-1}$; and determining the n supplementary received beams based on the target supplementary beam weight.

It should be noted that, before the supplementing the beam domain received signal with a target received beam signal, the method further includes:

determining a quantity of supplementary received beams based on the channel information of the UE or a priority of the UE.

The channel information of the UE includes a signal-to-noise ratio of the user channel, a moving speed of the UE, a spread angle of the UE, and a quantity of multipath directions of the user channel, For example, for UE with a large spread angle, energy is dispersed on a relatively large quantity of received beams, and a quantity of supplementary received beams may be increased to comprehensively receive the energy. For UE that is relatively strongly interfered by UE in another cell, a relatively large quantity of supplementary received beams may be added to ensure communication quality of the UE.

It should be noted that transmission traffic of the eCPRI is determined by using a new radio bandwidth and a quantity of received beams. On a premise of ensuring that total transmission traffic does not exceed the transmission traffic of the eCPRI, to improve accuracy of a received beam of moving UE, a quantity of supplementary received beams of the moving UE may be greater than a quantity of supplementary received beams of static UE. To be specific, when the quantity of supplementary received beams is determined, the quantity of supplementary received beams may be in positive correlation with the moving speed of the UE. When a scheduled bandwidth on the eCPRI is not fully used, if an optical fiber capacity is fixed, more supplementary received beams may be allocated to a user in the scheduled bandwidth, to improve system coverage and a system capacity. In addition, based on the channel information of the UE, different quantities of supplementary received beams may be allocated to different UEs in a limited optical fiber capacity, to optimize system performance.

In addition, the priority of the UE may be determined based on a service type of the UE, whether a signal is retransmitted, or the like. For example, the service type may include a home subscriber, an enterprise private line, a dedicated network service, and the like. Compared with that of UE of the home subscriber, a quantity of supplementary received beams of UE of the dedicated network service is larger.

The quantity of supplementary received beams is adaptively adjusted, to maximize received energy and improve a multi-antenna dimension, and frequency domain data received from the supplementary received beams is transmitted to the RRS for channel estimation and equalization, so that the system coverage and the system capacity can be improved when the optical fiber capacity is limited.

Further, after the beam domain received signal is obtained, the method further includes:

adjusting a data bit width of the eCPRI based on a preset measurement value; and transmitting the beam domain received signal to the RCC by using the eCPRI.

Optionally, the preset measurement value may include measurement values such as signal-to-noise ratios or interference strength of different user channels or different UEs.

For example, for UE whose user channel has a relatively low signal-to-noise ratio, when the signal-to-noise ratio is not affected, a relatively small quantized data bit width may be used to represent an uplink signal sent by the UE. A data bit width of a bandwidth in which the UE is located is determined by using a signal-to-noise ratio of a scheduled user, so that transmission traffic of the eCPRI can be reduced. Therefore, more UEs can be scheduled when the transmission traffic of the eCPRI is limited.

The transmitting the beam domain received signal to the RCC by using the eCPRI includes:

transmitting, to the RCC by using the eCPRI, domain received signal a bandwidth scheduled for a user.

For example, only frequency domain data (beam domain received signal) in a bandwidth scheduled for the user may be transmitted to the RCC based on a scheduled bandwidth of the system at a current moment and an occupied bandwidth of a control channel. For example, if a bandwidth of the system at the current moment is 20M, and the bandwidth scheduled for the user is 10M, the RRS may transmit, to the RCC, only the 10M bandwidth scheduled for the user, so that a quantity of users who can be scheduled in the system can be ensured when a transmission bandwidth is limited.

For another example, a resource allocation manner in a comb form (at intervals of one or more subcarriers) may be used on a channel, in other words, resources are occupied at intervals. For example, the resource allocation manner in the comb form may be used on a DMRS channel and an SRS channel, When transmitting data to the RCC by using the eCPRI, the RRS may adjust a frequency channel number of frequency domain data, and transmit only frequency domain data to which a resource is allocated.

According to a second aspect, a data dimension reduction apparatus is provided, and is applied to a radio remote system RRS. The RRS is connected to a radio cloud center RCC by using a common public radio interface eCPRI. The apparatus includes at least one module. The at least one module is configured to implement the data dimension reduction method provided in the first aspect.

According to a third aspect, a data dimension reduction system is provided. The system includes an RCC and a plurality of RRSs. At least one of the RRSs includes the apparatus according to the second aspect, and the plurality of RRSs are connected to the RCC by using an eCPRI.

According to a fourth aspect, a computer device is provided, and includes a memory, a processor, and a computer program that is stored in the memory and that can be run on the processor. When executing the computer program, the processor implements the data dimension reduction method provided in the first aspect.

According to a fifth aspect, a computer-readable storage medium is provided. The computer-readable storage medium stores an instruction, and when the instruction is executed by a processor, the data dimension reduction method provided in the first aspect is implemented. The computer-readable storage medium is a non-transitory computer-readable storage medium.

According to a sixth aspect, a computer program product including an instruction is provided. When the computer program product is run on a computer device, the computer device is enabled to implement the data dimension reduction method provided in the first aspect.

Beneficial effects of the technical solutions provided in this application are as follows:

According to the data dimension reduction method, apparatus, and system, the computer device, and the storage medium provided in the embodiments of the present invention, after receiving the antenna domain received signal, the RRS may determine the received beam weight based on the channel information of the UE, and perform dimension reduction on the received antenna domain received signal by using the received beam weight, to obtain the beam domain received signal. Because the different received beam weights are determined based on the different channel information, beam domain received signals obtained after dimension reduction is performed on different antenna domain received signals may have different dimensions, so that flexibility of data dimension reduction is improved.

BRIEF DESCRIPTION OF DRAWINGS

FIG. 3-1 is a schematic diagram of a received beam according to an embodiment of the present invention;

FIG. 3-2 is a schematic diagram of another received beam according to an embodiment of the present invention;

FIG. 4-1 is a schematic structural diagram of a data dimension reduction apparatus according to an embodiment of the present invention;

FIG. 4-2 is a schematic structural diagram of an obtaining module according to an embodiment of the present invention;

FIG. 4-3 is a schematic structural diagram of another data dimension reduction apparatus according to an embodiment of the present invention;

FIG. 4-4 is a schematic structural diagram of still another data dimension reduction apparatus according to an embodiment of the present invention;

FIG. 4-5 is a schematic structural diagram of yet another data dimension reduction apparatus according to an embodiment of the present invention;

FIG. 5-1 is a schematic structural diagram of a data dimension reduction system according to an embodiment of the present invention;

FIG. 5-2 is a schematic structural diagram of another data dimension reduction system according to an embodiment of the present invention;

FIG. 6-1 is a schematic structural diagram of a network device according to an embodiment of the present invention; and FIG. 6-2 is a schematic diagram of an application program unit related to an embodiment shown in FIG. 6-1.

DESCRIPTION OF EMBODIMENTS

To make the objectives, technical solutions, and advantages of this application clearer, the following further describes the implementations of this application in detail with reference to the accompanying drawings.

Figure 1:
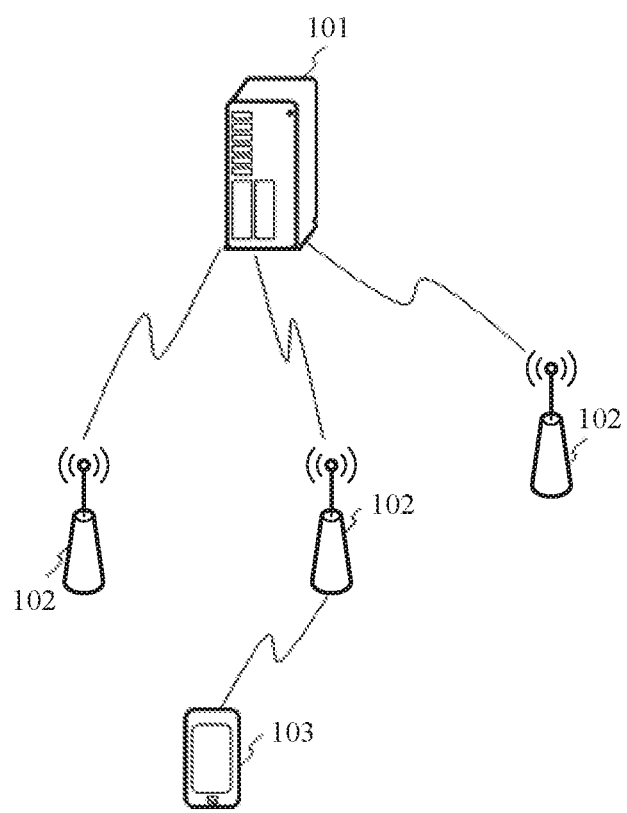
FIG. 1 is a schematic diagram of an implementation environment related to a data dimension reduction method according to an embodiment of the present invention.

FIG. 1 is a schematic diagram of an implementation environment related to a data dimension reduction method according to an embodiment of the present invention. The implementation environment may include an. RCC 101, at least one RRS 102, and at least one user equipment (UE) 103.

The RRS 102 and the RCC 101 are base station devices. The RRS 102 and the RCC 101 are connected. by using a connection component such as an optical fiber, The RRS 102 is connected to an antenna by using a feeder, and communicates with the UE 103 by using the antenna.

A conventional interface between a BBU and. an RRU is a CPRI. Currently, after functions of the BBU and the RRU are re-classified by using the interface, a BBU in a base station device in a 5G wireless network is redefined as an RCC, and an RRU is redefined as an RRS. To differ from the conventional interface between the BBU and the RRU, an interface between the RCC and the RRS is defined as an eCPRI.

In an uplink, the RRS 102 may receive, by using the antenna, an uplink signal sent by the UE 103, preprocess the uplink signal, and transmit a preprocessed signal to the RCC 101 by using the eCPRI.

For example, a long term evolution (LTE) network is used as an example, and uplink baseband processing and downlink baseband processing may be classified. into load-related user-level processing and load-unrelated cell-level processing. Functions of the RRS and the RCC that are classified by using the eCPRI are shown in Table 1. The RRS implements signal sampling/recovery, resource mapping/demapping, and data dimension reduction processing. The RCC implements processing such as channel mapping and preceding, channel estimation and equalization, modulation/demodulation, bit-level processing, radio circuit control, and packet data convergence. "/" represents "or".

The signal sampling/recovery and the resource mapping/demapping are load-unrelated cell-level processing, and other processing is load-related user-level processing. In addition, the channel estimation and equalization are load-related user-level processing, and processing complexity of the channel estimation and equalization is positively correlated with a quantity of array antennas used for receiving a signal.

TABLE 1

|     | Downlink | Uplink |
| --- | --- | --- |
| RRS | Resource mapping and signal recovery | Signal sampling and resource demapping |
|     |          | Data dimension reduction processing |
| RCC | Channel mapping and precoding | Channel estimation and equalization |
|     | Modulation | Demodulation |
|     | Bit-level processing | Bit-level processing |
|     | Radio circuit control | Radio circuit control |
|     | Packet data convergence | Packet data convergence |

It can be learned from Table 1 that in the uplink, the RRS may perform dimension reduction on a received uplink signal (that is, time domain data) to obtain a beam domain received signal (that is, frequency domain data), and transmit the beam domain received signal to the RCC by using the eCPRI.

However, in a related technology, when dimensionally reducing the time domain data in antenna domain to the frequency domain data in beam domain, the RRS performs dimension reduction on the data by using a preset fixed beam domain weight. In other words, for different UEs, different quantities of UEs, and different scheduled bandwidths, dimension reduction is performed on data by using a same beam domain weight. Consequently, data dimension reduction has relatively low flexibility.

Figure 2:
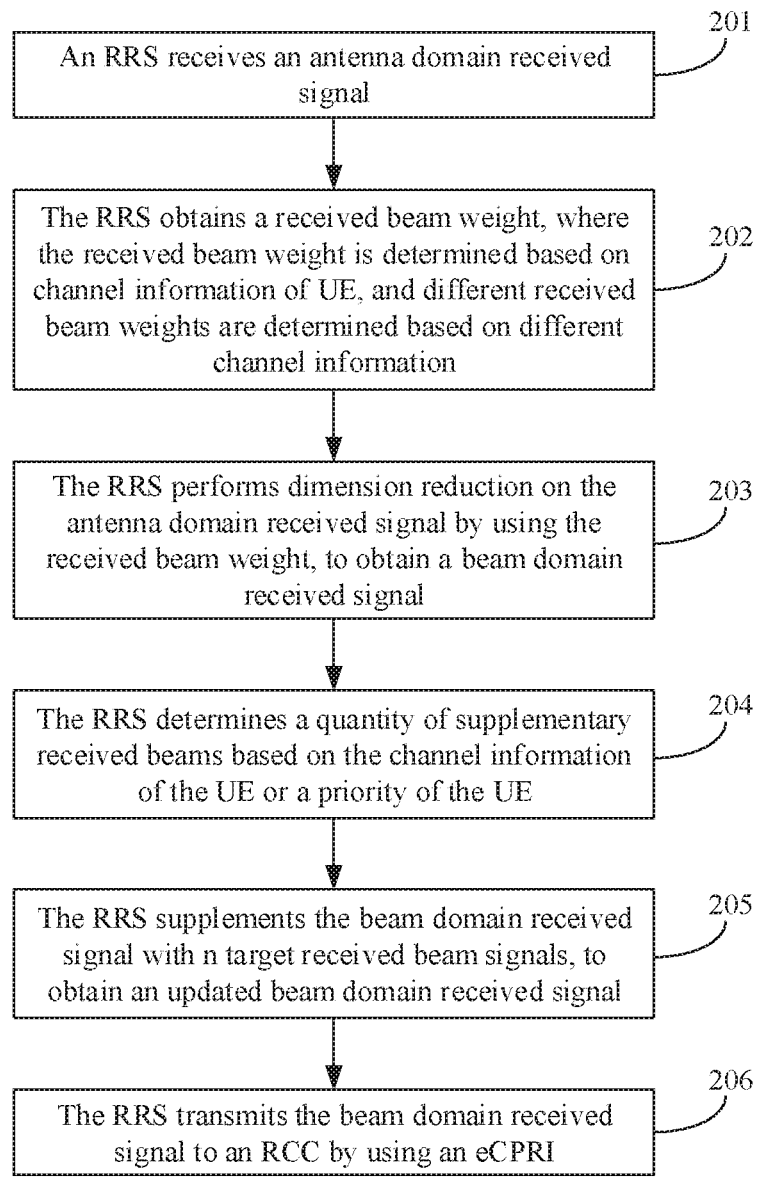
FIG. 2 is a flowchart of a data dimension reduction method according to an embodiment of the present invention.

To resolve a problem of relatively low flexibility of data dimension reduction in a related technology, an embodiment of the present invention provides a data dimension reduction method that can be applied to an RRS. As shown in FIG. 2, the method may include the following steps.

Step 201: The RRS receives an antenna domain received signal.

The antenna domain received signal includes an uplink signal that is sent by UE and that is received by an array antenna corresponding to the RRS, the antenna domain received signal is a time domain signal, a dimension of the antenna domain received signal is $N_1$, and $N_1$ is an integer greater than 1. One RRS may correspond to a plurality of antennas.

It should be noted that, usually, one RRS manages one cell, and the antenna domain received signal is uplink signals that are sent by all UEs in a cell and that are received by antennas in the cell managed by the RRS.

For example, the UE sends an uplink signal X, and a quantity of array antennas corresponding to the RRS is $N_1$. An antenna domain received signal Y is obtained by separately sampling each antenna, and may be represented as: $Y=HX+K$. A dimension of the antenna domain received signal is $N_1$. H is a channel response matrix in antenna domain, the channel response matrix includes a channel response from each UE to an array antenna, K is a constant, and a quantity of rows of H is equal to $N_1$.

Step 202: The RRS obtains a received beam weight, where the received beam weight is determined based on channel information of the UE, and different received beam weights are determined based on different channel information.

Optionally, the RRS may obtain the received beam weight in a plurality of manners. For example, the RRS directly obtains the received beam weight. To be specific, the RRS obtains the channel information of the UE, and determines the received beam weight based on the channel information of the UE. For another example, an RCC obtains the received beam weight and delivers the received beam weight to the RRS. To be specific, the RCC determines the received beam weight based on the channel information of the UE, and the RRS receives the received beam weight sent by the RCC.

In this embodiment of the present invention, an example in which the received beam weight is determined by the RRS based on the channel information of the UE is used for description. For a method for determining the received beam weight by the RCC based on the channel information of the UE, refer to a method for determining the received beam weight by the RRS based on the channel information of the UE. Details are not described in this embodiment of the present invention.

For example, the RRS may obtain channel information of each UE based on a periodic sounding reference signal (SRS) sent to each UE, and determines the received beam weight based on the channel information of each UE. Alternatively, the RRS may obtain channel information of each UE based on a demodulation reference signal (DMRS) sent to each UE, and determines the received beam weight based on the channel information of each UE.

Optionally, the RRS may determine the received beam weight based on the channel information of the UE and a criterion such as a criterion of maximizing received energy of a target signal, a criterion of maximizing a signal-to-noise ratio of a target signal, or a criterion of maximizing a signal-to-interference plus noise ratio of a target signal.

For example, a method for determining, by the RRS, the received beam weight based on the channel information of the UE and the criterion of maximizing received energy of a target signal may include the following steps.

S11. Determine, based on channel information of all UEs, that a quantity of UEs for which space division multiplexing is used is M, and a channel response matrix in antenna domain is $H=[H_1, H_2, \ldots, H_M]$, where $H_i=N_1 \times L_i$, $L_i$ is a quantity of space division multiplexing layers $i^{th}$ UE, M is an integer greater than 1, and $N_1$ is a quantity of array antennas corresponding to the RRS.

It should be noted that the space division multiplexing (SDM) means that different beams are formed in different UE directions by using an adaptive array antenna, and each beam may provide one UE with a unique user channel without interference of other UE.

The channel information of all the UEs includes channel information from each UE to all antennas in the cell managed by the RRS.

S12. Determine, based on the criterion of maximizing received energy of a target signal, that the received beam weight is $W=[W_1, W_2, \ldots, W_M]^{-1}$, where $$W_i = \frac{1}{\|H_i\|^2} H_i^H.$$

i is an integer, $1 \leq i \leq M$, and a dimension of the received beam weight is $N_2 \times N_1$.

For example, a method for determining, by the RRS, the received beam weight based on the channel information of the UE and the criterion of maximizing a signal-to-interference plus noise ratio of a target signal may include the following steps.

S21. Determine, based on channel information of all UEs, that a channel response matrix m antenna domain is $H=[H_1, H_2, \ldots, H_M]$, where M is a quantity of all UEs.

The channel information of all the UEs includes channel information from each UE to all antennas in a cell in which the UE is located.

S22. Determine, based on the channel response matrix, that the received beam weight is $W=H^H R_{uu}^{-1}$, where $R_{uu}$ is an interference covariance matrix.

The received beam weight is an interference whitening weight, the interference whitening weight is a weight for changing colored noise (that is, correlated interference on each antenna) into white noise. The interference covariance matrix is determined based on an interference signal of UE in another cell (that is, a cell managed by another RRS). A dimension of the received beam weight obtained based on the foregoing formula is $N_2 \times N_1$.

Step 203: The RRS performs dimension reduction on the antenna domain received signal by using the received beam weight, to obtain a beam domain received signal.

The beam domain received signal is a frequency domain signal, a dimension of the beam domain received signal is $N_2$, and $0 < N_2 < N_1$.

Optionally, if the antenna domain received signal Y is $Y=HX+K$, and the received beam weight is W, the beam domain received signal Y' may be represented as $Y'=W(HX+K)$. The dimension of the antenna domain received signal Y is $N_1$, and the dimension of the received beam weight is $N_2 \times N_1$. In this case, it may be determined, based on the foregoing formula, that the dimension of the beam domain received signal Y' is $N_2$.

Figures 1, 3:
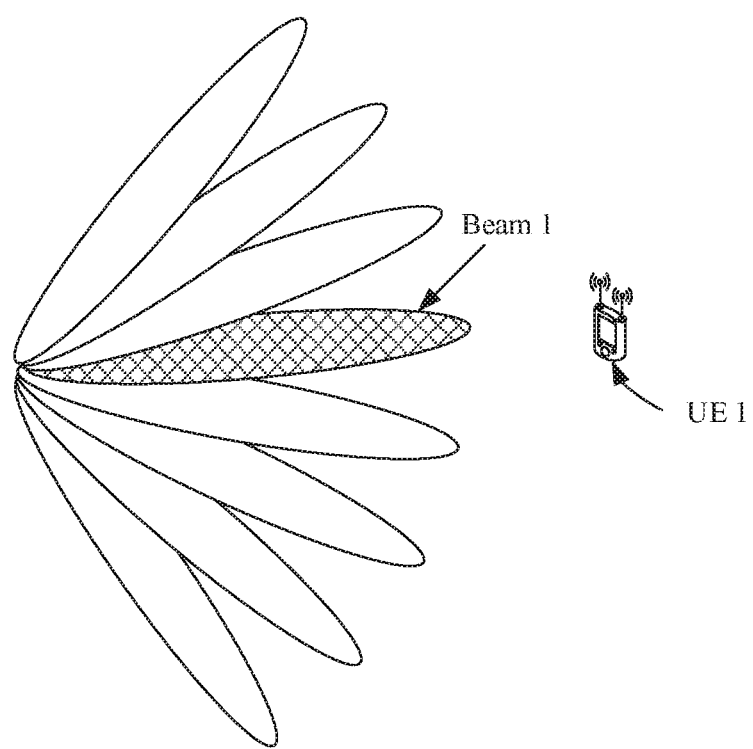
Figures 2, 3:
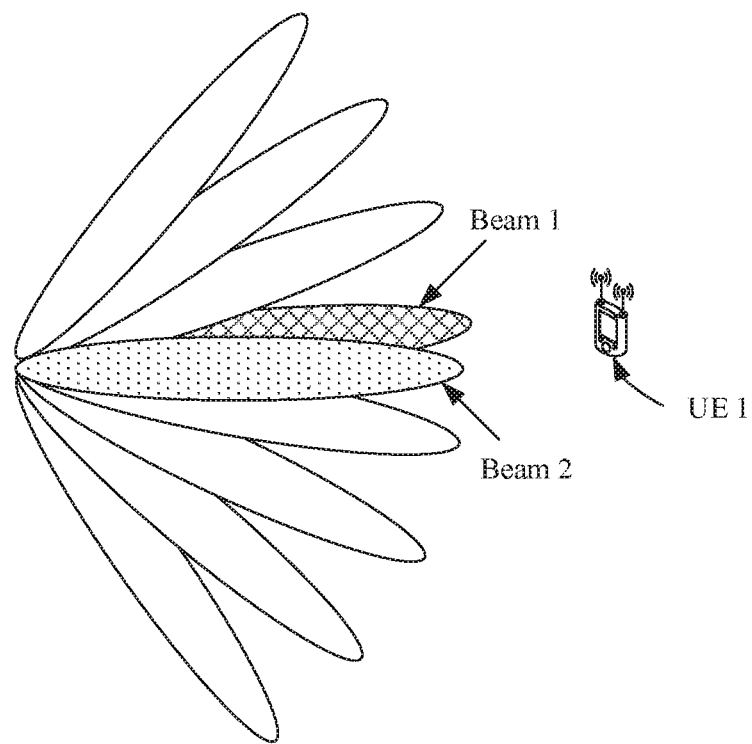

FIG. 3-1 is a schematic diagram of a received beam according to an embodiment of the present invention. As shown in FIG. 3-1, a beam domain received signal corresponding to an uplink signal transmitted by UE 1 is received by an adaptive received beam 1. Dimension reduction is performed on the antenna domain received signal by using the received beam weight, to obtain the beam domain received signal. To be specific, an adaptive received beam is determined by using the received beam weight, and a signal is received by using the adaptive received beam. The adaptive received beam is a beam used to receive the beam domain received signal.

For example, it is assumed that the RRS corresponds to $N_1$ antennas. After the adaptive received beam is determined by using the received beam weight, the adaptive received beam includes $N_2$ antennas, and a dimension of an antenna domain received signal received by using the adaptive received beam is $N_2$. To be specific, the signal received by using the adaptive received beam is a beam domain received signal actually transmitted by the RRS to the RCC, so that dimension reduction on the antenna domain received signal is implemented.

It should be noted that adaptive received beams may better form a directivity pattern based on different paths through which uplink signals of the UE are propagated in space. Different antenna gains are provided in different arrival directions, and a narrow beam is formed in real time and is aligned with an uplink signal. In addition, in another direction, a side lobe is suppressed to a greatest extent, and directional receiving is used, so that a system capacity increases.

Due to a scattering environment and mobility of a mobile station, an arrival direction of an uplink signal received by the RRS is time-varying. Signals that have close frequencies but that can be separated in space may be separated by using an adaptive received beam, and the signals are tracked to adjust a weight of an array antenna, so that a beam of the array antenna points to a direction of a target signal. A signal is received by using the adaptive received beam, so that a received beam direction is relatively accurate, or an interference suppression effect is relatively good. Frequency domain data of the adaptive received beam is transmitted to a baseband to perform channel estimation and equalization, to improve system coverage and a system capacity when an optical fiber capacity is limited.

Step 204: The RRS determines a quantity of supplementary received beams based on the channel information of the UE or a priority of the UE.

When a channel changes, to improve robustness of a received beam, the supplementary received beam may be added based on the adaptive received beam. The supplementary received beam may be n fixed received beams having highest received energy in the cell, or the supplementary received beam may be n directional received beams that are predicted based on a multipath direction of a user channel and a moving direction, where n is a positive integer.

The channel information of the UE includes a signal-to-noise ratio of the user channel, a moving speed of the UE, a spread angle of the UE, and a quantity of multipath directions of the user channel. For example, for UE with a large spread angle, energy is dispersed on a relatively large quantity of received beams, and a quantity of supplementary received beams may be increased to comprehensively receive the energy. For UE that is relatively strongly interfered by UE in another cell, a relatively large quantity of supplementary received beams may be added to ensure communication quality of the UE.

It should be noted that transmission traffic of the eCPRI is determined by using a new radio bandwidth and a quantity of received beams. On a premise of ensuring that total transmission traffic does not exceed the transmission traffic of the eCPRI, to improve accuracy of a received beam of moving UE, a quantity of supplementary received beams of the moving UE may be greater than a quantity of supplementary received beams of static UE. To be specific, when the quantity of supplementary received beams is determined, the quantity of supplementary received beams may be in positive correlation with the moving speed of the UE. When a scheduled bandwidth on the eCPRI is not full, if an optical fiber capacity is fixed, more supplementary received beams may be allocated to a user in the scheduled bandwidth, to improve system coverage and a system capacity. In addition, based on the channel information of the UE, different quantities of supplementary received beams may be allocated to different UEs in a limited optical fiber capacity, to optimize system performance.

In addition, the priority of the UE may be determined based on a service type of the UE, whether a signal is retransmitted, or the like. For example, the service type may include a home subscriber, an enterprise private line, a dedicated network service, and the like. Compared with that of UE of the home subscriber, a quantity of supplementary received beams of LIE of the dedicated network service is larger. (to be specific, a priority of the UE of the dedicated network service is higher than that of the UE of the home subscriber). A priority of UE that needs to retransmit a signal is higher than a priority of UE that initially transmits a signal.

The quantity of supplementary received beams is adaptively adjusted, to increase received energy and improve a multi-antenna dimension, and frequency domain data received from the supplementary received beams is transmitted to the RRS for channel estimation and equalization, so that the system coverage and the system capacity can be improved when the optical fiber capacity is limited.

Step 205: The RRS supplements the beam domain received signal with n target received beam signals, to obtain an updated beam domain received signal.

Optionally, the target received beam signals may be signals received by n supplementary received beams in a preset fixed direction. For example, the supplementary received beams may be n fixed received beams that have strongest received energy in the cell, where n is a positive integer. For example, FIG. 3-2 is a schematic diagram of a received beam according to an embodiment of the present invention. As shown in FIG. 3-2, the received beams may include a beam 1 and a beam 2, the beam 1 is an adaptive received beam, the beam 2 is a fixed received beam, and a direction to which the fixed received beam 2 points is different from a direction to which the adaptive received beam 1 points. An uplink signal transmitted by UE 1 may be received by the RRS separately by using the adaptive received beam 1 and the fixed received beam 2. A signal received by the adaptive received beam 1 is a beam domain received signal, and a signal received by the fixed received beam 2 is a target received beam signal.

Optionally, the target received beam signals may alternatively be signals received by n directional supplementary received beams that are predicted based on the multipath direction of the user channel and the moving direction, where n is a positive integer. A method for predicting the n directional supplementary received beams based on the multipath direction of the user channel and the moving direction may include the following steps.

S51. Determine a supplementary beam weight of a received beam whose arrival angle is $\theta$ is:

$$W_\theta = \left[1, e^{-j\cdot 2\pi \cdot \frac{d}{\lambda}\cdot \sin\theta}, \ldots, e^{-j\cdot 2\pi\cdot (N_1-1)\frac{d}{\lambda}\cdot\sin\theta}\right],$$

where d is a distance between the array antennas, $\lambda$ is a wavelength of the received beam, $N_1$ is a quantity of array antennas, and the arrival angle $\theta$ is an angle between the UE and a normal line of the array antenna.

S52. Determine that a target supplementary beam weight is $W_{supplement}=[W_{\theta^1}, W_{\theta^2}, \ldots, W_{\theta^n}]^{-1}$.

S53, Determine n supplementary received beams based on the target supplementary beam weight.

It should be noted that, a dimension of a signal received by each supplementary received beam is $1\times N_1$, and a target received beam signal Y" may be represented as: Y"=$W_{supplement}$(HX+K).

Step 205: Adjust a data bit width of the eCPRI based on a preset measurement value.

Optionally, the preset measurement value may include measurement values such as signal-to-noise ratios or interference strength of different user channels or different UEs.

For example, for UE whose user channel has a relatively low signal-to-noise ratio, when the signal-to-noise ratio is not affected., a relatively small quantized data bit width may be used to represent an uplink signal sent by the UE. A data bit width of a bandwidth in which the UE is located is determined by using a signal-to-noise ratio of a scheduled user, so that transmission traffic of the eCPRI can be reduced. Therefore, more UEs can be scheduled when the transmission traffic of the eCPRI is limited.

Step 206: The RRS transmits the beam domain received signal to the RCC by using the eCPRI.

Optionally, the RRS may transmit, to the RCC by using the eCPRI, the beam domain received signal in a bandwidth scheduled for a user.

For example, only frequency domain data (beam domain received information) in a bandwidth scheduled for the user may be transmitted to the RCC based on a scheduled bandwidth of the system at a current moment (in actual application, a system time is counted in a form of a frame) and an occupied bandwidth of a control channel. For example, if a bandwidth of the system at the current moment is 20M and the bandwidth scheduled for the user is 10M, the RRS may transmit, to the RCC, only the 10M of bandwidth scheduled for the user, so that a quantity of users who can be scheduled in the system can be ensured when a transmission bandwidth is limited.

For another example, a resource allocation manner in a comb form (at intervals of one or more subcarriers) may be used on a channel, in other words, resources are occupied at intervals. For example, the resource allocation manner in the comb form may be used on a DMRS channel and an SRS channel. When transmitting data to the RCC by using the eCPRI, the RRS may adjust a frequency channel number of frequency domain data, and transmit only frequency domain data to which a resource is allocated.

It should be noted that, in this embodiment of the present invention, for different physical channels, such as a service channel and a control channel, dimension reduction may be performed based on different dimension reduction targets and actual requirements such as a demodulation requirement and a performance requirement. After dimension reduction is performed based on different dimension reduction targets, directions and quantities of adaptive received beams are different, quantities of supplementary received beams are different, and data bit widths of bandwidths in which UE is located are different. For example, the control channel has a higher requirement for stability of demodulation. Therefore, more supplementary received beams may be added for the control channel.

The data dimension reduction method provided in this embodiment of the present invention can be applied to both an RRS in a centralized network architecture (that is, an architecture in which an RCC is deployed in a centralized manner) and an RRS in a distributed network architecture (that is, an architecture in which an RCC is deployed in a distributed manner).

It should be noted that a sequence of the steps of the data dimension reduction method provided in this embodiment of the present invention may be properly adjusted, and a step may be added or removed based on a situation. Any variation readily figured out by a person skilled in the art within the technical scope disclosed in the present invention shall fall within the protection scope of this application. Therefore, details are not described herein.

In conclusion, according to the data dimension reduction method provided in this embodiment of the present invention, after receiving the antenna domain received signal, the RRS may determine the received beam weight based on the channel information of the UE, and perform dimension reduction on the received antenna domain received signal by using the received beam weight, to obtain the beam domain received signal. Because the different received beam weights are determined based on the different channel information, beam domain received signals obtained after dimension reduction is performed on different antenna domain received signals may have different dimensions, so that flexibility of data dimension reduction is improved.

Figures 1, 4:
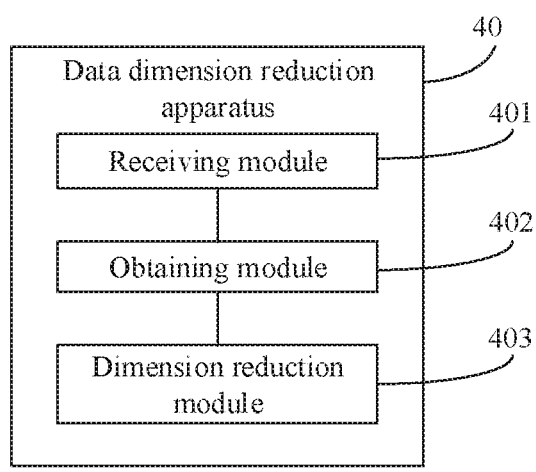
Figures 2, 4:
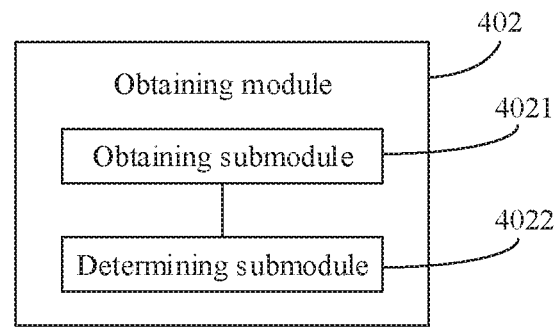
Figures 3, 4:
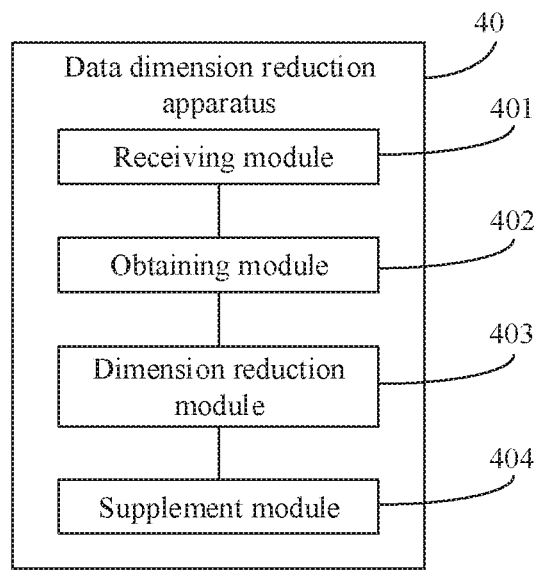
Figure 4:
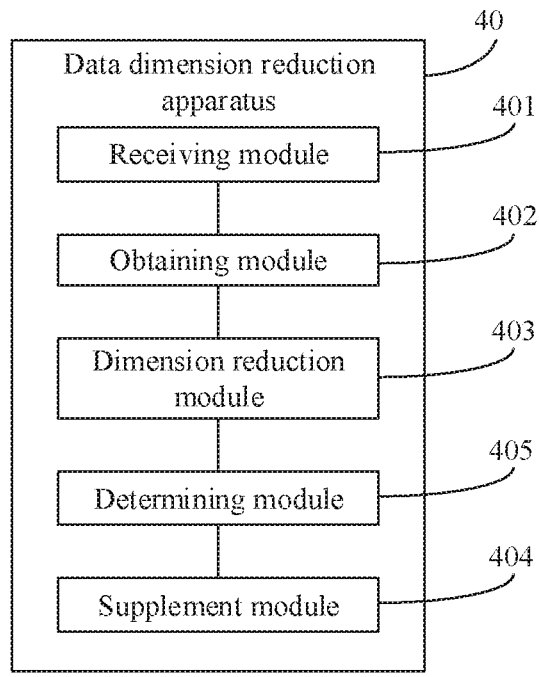

An embodiment of the present invention provides a data dimension reduction apparatus, applied to an RRS. The RRS is connected to an RCC by using an eCPRI. As shown in FIG. 4-1, the apparatus 40 may include:

a receiving module 401, configured to receive an antenna domain received signal, where the antenna domain received signal includes an uplink signal that is sent by user equipment UE and that is received by an array antenna corresponding to the RRS, the antenna domain received signal is a time domain signal, a dimension of the antenna domain received signal is $N_1$, and $N_1$ is an integer greater than 1;

an obtaining module 402, configured to obtain a received beam weight, where the received beam weight is determined based on channel information of the UE, and different received beam weights are determined based on different channel information; and a dimension reduction module 403, configured to perform dimension reduction on the antenna domain received signal by using the received beam weight, to obtain a beam domain received signal, where the beam domain received signal is a frequency domain signal, a dimension of the beam domain received signal is $N_2$, and $0 < N_2 < N_1$.

In conclusion, according to the data dimension reduction apparatus provided in this embodiment of the present invention, after receiving the antenna domain received signal by using the receiving module, the RRS may determine the received beam weight by using the obtaining module based on the channel information of the UE, and perform dimension reduction on the received antenna domain received signal by using the received beam weight and the dimension reduction module, to obtain the beam domain received signal. Because the different received beam weights are determined based on the different channel information, beam domain received signals obtained after dimension reduction is performed on different antenna domain received signals may have different dimensions, so that flexibility of data dimension reduction is improved.

Optionally, as shown in FIG. 4-2, the obtaining module 402 may include:

an obtaining submodule 4021, configured to obtain the channel information of the UE; and a determining submodule 4022, configured to determine the received beam weight based on the channel information of the UE.

Correspondingly, the obtaining module may be configured to:

obtain channel information of each UE based on an SRS sent to each UE; and determine the received beam weight based on the channel information of each UR Alternatively, the obtaining module may be configured to:

obtain channel information of each UE based on a DMRS sent to each UE; and determine the received beam weight based on the channel information of each UE.

The determining submodule may be configured to:

determine the received beam weight based on the channel information of the UE and a criterion of maximizing received energy of a target signal.

Further, the determining submodule may be configured to:

determine, based on channel information of all UEs, that a quantity of UEs for which space division multiplexing is used is M, and a channel response matrix in antenna domain is $H=H[H_1, H_2, \ldots, H_M]$, where $H_i=N_1 \times L_i$, $L_i$ is a quantity of space division multiplexing layers of $i^{th}$ an integer greater than 1, and $N_1$ is a quantity of array antennas corresponding to the RRS; and determine, based on the criterion of maximizing received energy of a target signal, that the received beam weight is $W=[W_1, W_2, \ldots, W_M]^{-1}$, where $$W_i = \frac{1}{\|H_i\|^2} H_i^H,$$

where i is an integer, and $1 \le i \le M$.

Alternatively, the determining submodule may be configured to:

determine, based on channel information of all UEs, that a channel response matrix in antenna domain is $h=[H_1, H_2, \ldots, H_M]$, where M is a quantity of all UEs; and determine, based on the channel response matrix, that the received beam weight is $W=H^H R_{uu}^{-1}$, where $R_{uu}$ is an interference covariance matrix.

Optionally, the obtaining module may be alternatively configured to:

receive the received beam weight sent by the RCC, where the received beam weight is determined by the RCC based on the channel information of the UE.

Further, as shown in FIG. 4-3, the apparatus 40 may further include:

a supplement module 404, configured to supplement the beam domain received signal with a target received beam signal, to obtain an updated beam domain received signal, where the target received beam signal is a signal received by n supplementary received beams in a preset fixed direction, or the target received beam signal is a signal received by n directional supplementary received beams that are predicted based on a multipath direction of a user channel and a moving direction, and n is a positive integer.

Optionally, the supplement module may be configured to: determine that a supplementary beam weight of a received beam whose arrival angle is θ is $$W_\theta = \left[1, e^{-j \cdot 2\pi \cdot \frac{d}{\lambda} \cdot \sin\theta}, \ldots, e^{-j \cdot 2\pi \cdot (N_1-1)\frac{d}{\lambda} \cdot \sin\theta}\right],$$

where d is a distance between the array antennas, λ is a wavelength of the received beam, and $N_1$ is a quantity of array antennas;

determine that a target supplementary beam weight is $W_{supplement} = [W_{\theta^1}, W_{\theta^2}, \ldots, W_{\theta^n}]^{-1}$; and determine the n supplementary received beams based on the target supplementary beam weight.

Still further, as shown in FIG. 4-4, the apparatus 40 may further include:

a determining module 405, configured to determine a quantity of supplementary received beams based on the channel information of the UE or a priority of the UE.

The channel information of the UE may include a signal-to-noise ratio of the user channel, a moving speed of the UE, a spread angle of the UE, and a quantity of multipaths of the user channel. The priority of the UE may be determined based on a service type of the UE.

Figures 4, 5:
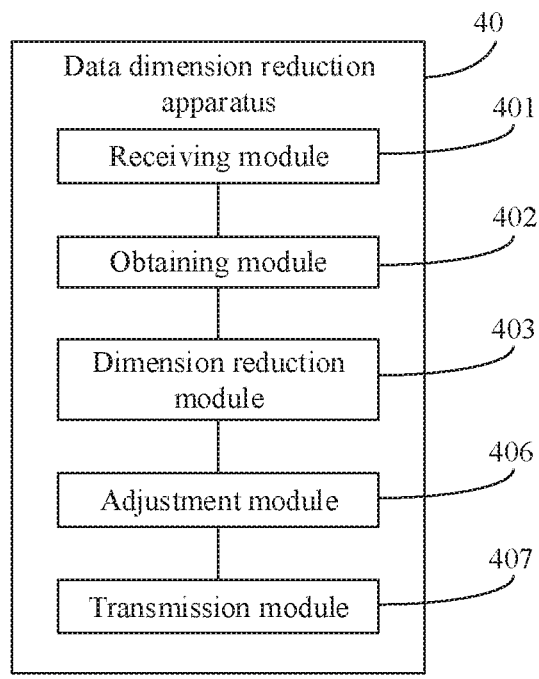
Figures 1, 5:
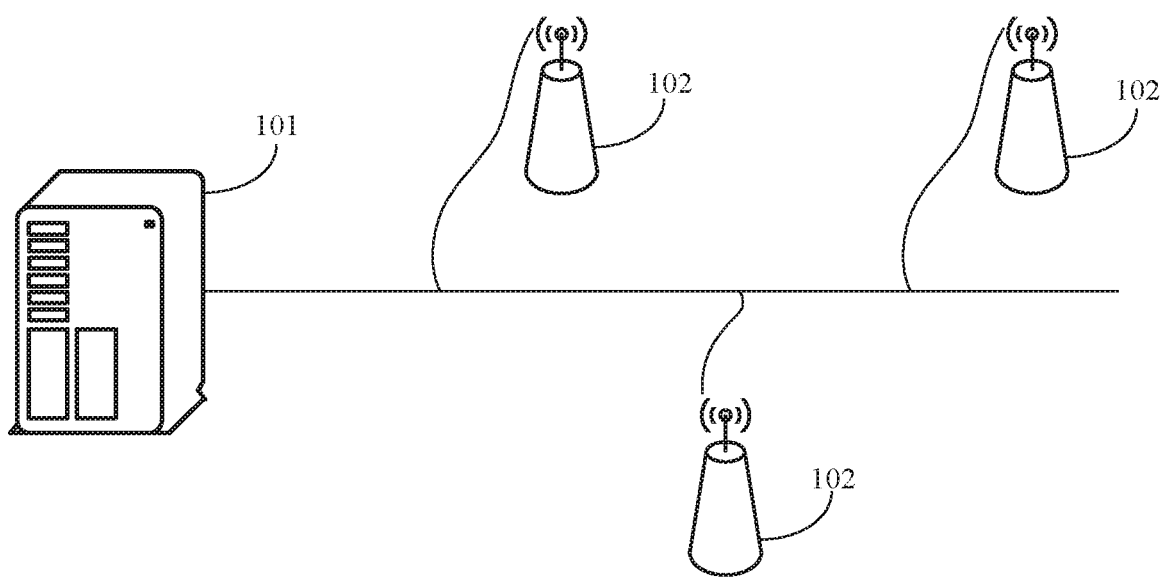
Figures 2, 5:
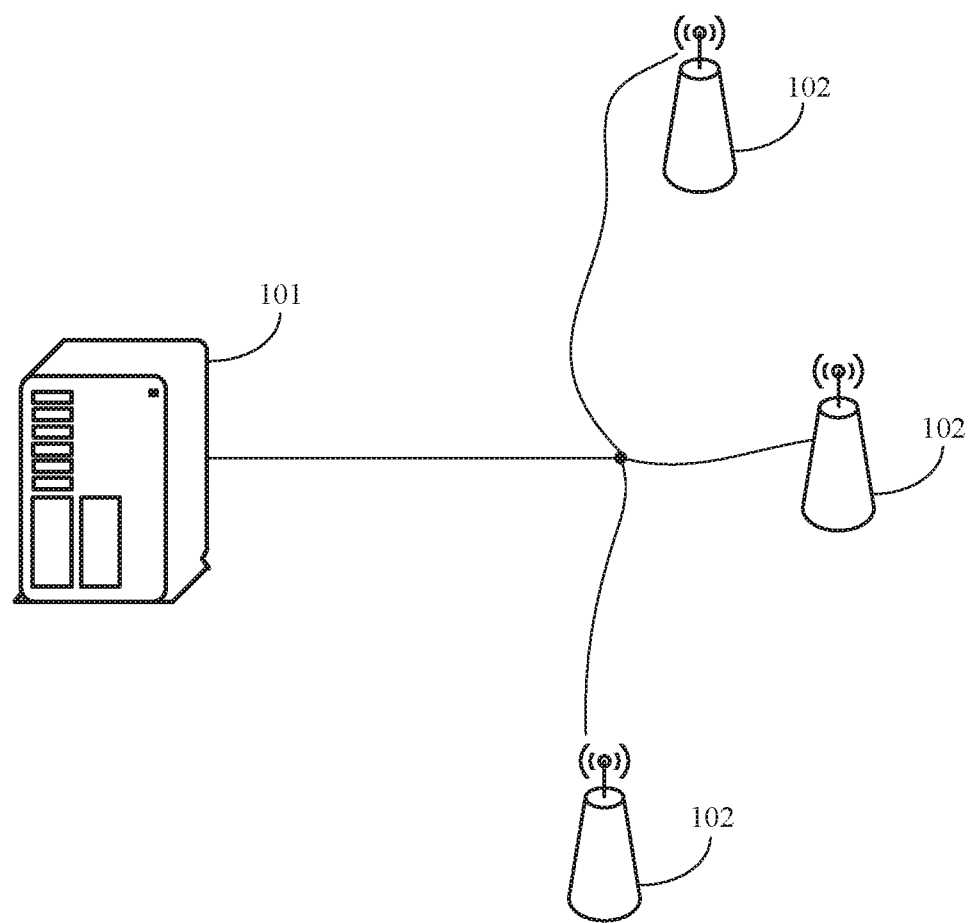

Optionally, as shown in FIG. 4-5, the apparatus 40 may further include:

an adjustment module 406, configured to adjust a data bit width of the eCPRI based on a preset measurement value; and a transmission module 407, configured to transmit the beam domain received signal to the RCC by using the eCPRI.

Correspondingly, the transmission module 407 may be configured to:

transmit, to the RCC by using the eCPRI, the beam domain received signal in a bandwidth scheduled for a. user.

In conclusion, according to the data dimension reduction apparatus provided in this embodiment of the present invention, after receiving the antenna domain received signal by using the receiving module, the RRS may determine the received beam weight by using the obtaining module based on the channel information of the UE, and perform dimension reduction on the received antenna domain received signal by using the received beam weight and the dimension reduction module, to obtain the beam domain received signal. Because the different received beam weights are determined based on the different channel information, beam domain received signals obtained after dimension reduction is performed on different antenna domain received signals may have different dimensions, so that flexibility of data dimension reduction is improved.

For the apparatus in the foregoing embodiment, specific manners of performing operations by all the module are described in detail in the embodiment related to the method. Details are not described herein.

An embodiment of the present invention provides a data dimension reduction system. The system may include an RCC and a plurality of RRSs, at least one RRS includes the apparatus 40 shown in any one of FIG. 4-1 and FIG. 4-3 to FIG. 4-5, and the plurality of RRSs are connected to the RCC by using a common public radio interface eCPRI.

Optionally, as shown in FIG. 5-1, the plurality of RRSs 102 are connected to the RCC 101 in a cascading manner by using an optical fiber.

The plurality of RRSs need to use a same optical fiber to transmit beam domain received signals to the RCC. To ensure that data on each RRS can be effectively transmitted to the RCC, each RRS needs to perform dimension reduction on a received antenna domain received signal according to the foregoing data dimension reduction method based on total traffic of the data that needs to be transmitted by the plurality of RRSs.

Optionally, as shown in FIG. 5-2, the plurality of RRSs 102 are connected to the RCC 101 in a star connection manner by using an optical fiber.

For example, each RRS is connected to a base station device by using an optical fiber whose bandwidth is 25 G. After a plurality of optical fibers corresponding to the plurality of RRSs are converged on the base station device, data that needs to be transmitted by each RRS may be transmitted to the RCC by using an optical fiber whose bandwidth is 30 G. Because the data that needs to be transmitted by the plurality of RRSs finally needs to be transmitted to the RCC by using the optical fiber whose bandwidth is 30 G, each RRS needs to be constrained by the optical fiber whose bandwidth is 30 G, and dimension reduction is performed on the received antenna domain received signal according to the foregoing data dimension reduction method based on the total traffic of the data that needs to be transmitted by the plurality of RRSs.

In conclusion, according to the data dimension reduction system provided in this embodiment of the present invention, after receiving the antenna domain received signal by using a receiving module, the RRS may determine a received beam weight by using an obtaining module based on channel information of UE, and perform dimension reduction on the received antenna domain received signal by using the received beam weight and a dimension reduction module, to obtain a beam domain received signal. Because different received beam weights are determined based on different channel information, beam domain received signals obtained after dimension reduction is performed on different antenna domain received signals may have different dimensions, so that flexibility of data dimension reduction is improved.

Figures 1, 6:
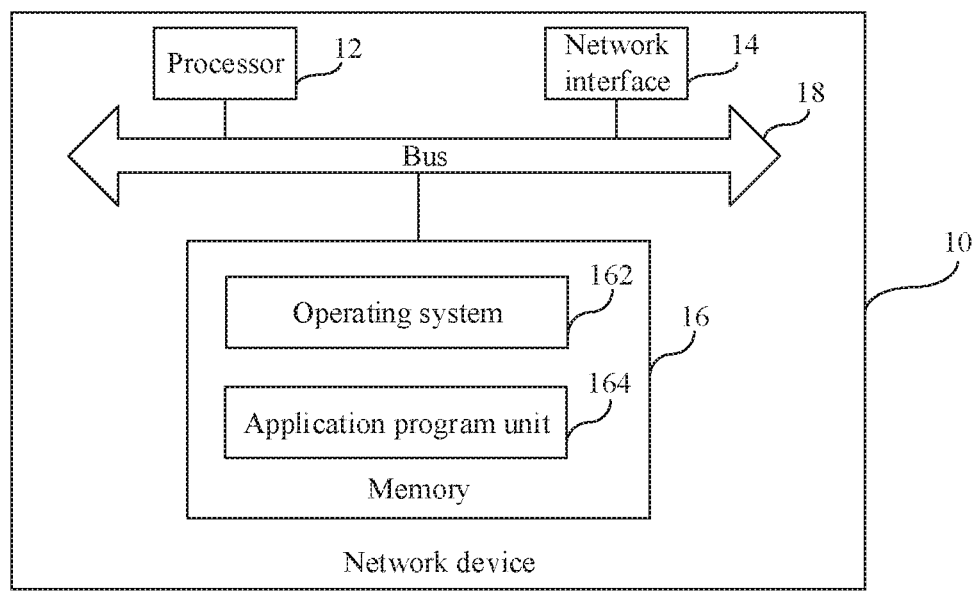
Figures 2, 6:
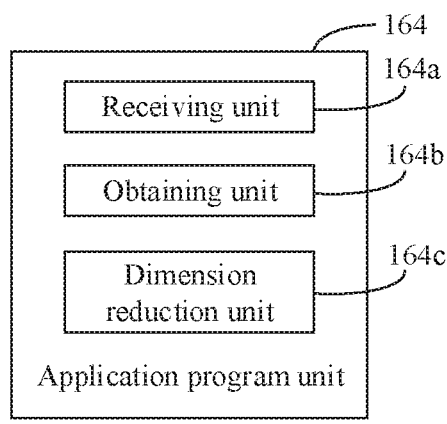

FIG. 6-1 is a schematic structural diagram of a network device according to an example embodiment of the present invention. The network device 10 may be the RCC 101, the RRS 102, or the UE 103, and the network device 10 includes a processor 12 and a network interface 14.

The processor 12 includes one or more processing cores. The processor 12 implements various functional applications and data processing by running a software program and a unit.

There may be a plurality of network interfaces 14. The network interface 14 is configured to communicate with another storage device or network device.

Optionally, the network device 10 further includes components such as a memory 16 and a bus 18. The memory 16 and the network interface 14 are separately connected to the processor 12 by using the bus 18, The memory 16 may be configured to store the software program and the unit. Specifically, the memory 16 may store an operating system 162 and an application program unit 164 required for at least one function. The operating system 162 may be an operating system such as a real-time operating system (RTX), LINUX, UNIX, WINDOWS, or OS X.

FIG. 6-2 is a schematic diagram of an application program unit related to an embodiment shown in FIG. 6-1. As shown in FIG. 6-2, when the network device 10 is the RRS 102, the application program unit 164 may be a receiving unit 164a, an obtaining unit 164b, and a dimension reduction unit 164c.

The receiving unit 164a has a function the same as or similar to that of the receiving module 401.

The obtaining unit 164b has a function the same as or similar to that of the obtaining module 402.

The dimension reduction unit 164c has a function the same as or similar to that of the dimension reduction module 403.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application should fall within the protection scope of this application.

What is claimed is:

1. A data dimension reduction method, applied to a radio remote system (RRS), wherein the RRS is connected to a radio cloud center (RCC) by using a common public radio interface (eCPRI), and the method comprises:
   receiving an antenna domain signal, wherein the antenna domain signal comprises an uplink signal that is sent by user equipment (UE) and that is received by an array antenna corresponding to the RRS, wherein the antenna domain signal is a time domain signal, wherein a dimension of a first matrix representing the antenna domain signal is $N_1$, and wherein $N_1$ is an integer greater than 1;
   obtaining a beam weight, wherein the beam weight is determined based on channel information of the UE, and wherein different beam weights are determined based on different channel information; and
   performing, based on multiplying the first matrix and the beam weight, dimension reduction on the antenna domain signal to obtain a beam domain signal, wherein the beam domain signal is a frequency domain signal, wherein a dimension of a second matrix representing the beam domain signal is $N_2$, and wherein $0 < N_2 < N_1$.

2. The method according to claim 1, wherein the obtaining a beam weight comprises:
   obtaining the channel information of the UE; and
   determining the beam weight based on the channel information of the UE.

3. The method according to claim 2, wherein the determining the beam weight based on the channel information of the UE comprises:
   determining the beam weight based on the channel information of the UE and a criterion of maximizing received energy of a target signal.

4. The method according to claim 3, wherein the determining the beam weight based on the channel information of the UE and a criterion of maximizing received energy of a target signal comprises:
   determining, based on channel information of all UEs, that a quantity of UEs for which space division multiplexing is used is M, and wherein a channel response matrix in antenna domain is $H=[H_1, H_2, \ldots, H_M]$, wherein $H_i=N_1 \times L_i$, $L_i$, is a quantity of space division multiplexing layers of $i^{th}$ UE, wherein M is an integer greater than 1, and wherein $N_1$ is a quantity of array antennas corresponding to the RRS; and
   determining, based on the criterion of maximizing received energy of the target signal, that the beam weight is $W=[W_1, W_2, \ldots, W_M]^{-1}$, wherein $$W_i = \frac{1}{\|H_i\|^2} H_i^H,$$

wherein i is an integer, and wherein $1 \leq i \leq M$.

5. The method according to claim 2, wherein the beam weight is an interference whitening weight, and the determining the beam weight based on the channel information of the UE comprises:
   determining, based on channel information of all UEs, that a channel response matrix in antenna domain is $H=[H_1, H_2, \ldots, H_M]$, wherein M is a quantity of all UEs; and
   determining, based on the channel response matrix, that the beam weight is $W=H^H R_{uu}^{-1}$, wherein $R_{uu}$ is an interference covariance matrix.

6. The method according to claim 1, wherein the obtaining a beam weight comprises:
   receiving the beam weight sent by the RCC, wherein the beam weight is determined by the RCC based on the channel information of the UE.

7. The method according to claim 1, wherein, after performing the dimension reduction on the antenna domain signal, the method further comprises:
   supplementing the beam domain signal with a target beam signal to obtain an updated beam domain signal, wherein the target beam signal is a signal received by n supplementary beams in a preset fixed direction, or wherein the target beam signal is a signal received by n directional supplementary beams that are predicted based on a multipath direction of a user channel and a moving direction, and wherein n is a positive integer.

8. The method according to claim 7, wherein, before the supplementing the beam domain signal with a target beam signal, the method further comprises:
   determining a quantity of supplementary beams based on the channel information of the UE or a priority of the UE.

9. The method according to claim 1, wherein, after the beam domain signal is obtained, the method further comprises:

adjusting a data bit width of the eCPRI based on a preset measurement value; and transmitting the beam domain signal to the RCC by using the eCPRI.

10. A data dimension reduction apparatus, applied to a radio remote system (RRS), wherein the RRS is connected to a radio cloud center (RCC) by using a common public radio interface (eCPRI), and the apparatus comprises:

at least one processor;

a non-transitory computer-readable storage medium coupled to the at least one processor and storing programming instructions for execution by the at least one processor to:

receive an antenna domain signal, wherein the antenna domain signal comprises an uplink signal that is sent by user equipment (UE) and that is received by an array antenna corresponding to the RRS, wherein the antenna domain signal is a time domain signal, wherein a dimension of a first matrix representing the antenna domain signal is $N_1$, and wherein $N_1$ is an integer greater than 1;

obtain a beam weight, wherein the beam weight is determined based on channel information of the UE, and wherein different beam weights are determined based on different channel information; and perform, based on multiplying the first matrix and the beam weight, dimension reduction on the antenna domain signal to obtain a beam domain signal, wherein the beam domain signal is a frequency domain signal, wherein a dimension of a second matrix representing the beam domain signal is $N_2$, and wherein $0 < N_2 < N_1$.

11. The apparatus according to claim 10, wherein the programming instructions instruct the at least one processor to:

obtain the channel information of the UE; and determine the beam weight based on the channel information of the UE.

12. The apparatus according to claim 11, wherein the programming instructions instruct the at least one processor to:

determine the beam weight based on the channel information of the UE and a criterion of maximizing received energy of a target signal.

13. The apparatus according to claim 12, wherein the programming instructions instruct the at least one processor to:

determine, based on channel information of all UEs, that a quantity of UEs for which space division multiplexing is used is M, and wherein a channel response matrix in antenna domain is $H=[H_1, H_2, \ldots, H_M]$, wherein $H_i=N_1 \times L_i$, $L_i$ is a quantity of space division multiplexing layers of $i^{th}$ UE, wherein M is an integer greater than 1, and wherein $N_1$ is a quantity of array antennas corresponding to the RRS; and determine, based on the criterion of maximizing received energy of the target signal, that the beam weight is $W=[W_1, W_2, \ldots, W_M]^{-1}$, wherein $$W_i = \frac{1}{\|H_i\|^2} H_i^H,$$

wherein i is an integer, and wherein $1 \le i \le M$.

14. The apparatus according to claim 12, wherein the programming instructions instruct the at least one processor to:

determine, based on channel information of all UEs, that a channel response matrix in antenna domain is $H=[H_1, H_2, \ldots, H_M]$, wherein M is a quantity of all UEs; and determine, based on the channel response matrix, that the beam weight is $W=H^H R_{uu}^{-1}$, wherein $R_{uu}$ is an interference covariance matrix.

15. The apparatus according to claim 10, wherein the programming instructions instruct the at least one processor to:

receive the beam weight sent by the RCC, wherein the beam weight is determined by the RCC based on the channel information of the UE.

16. The apparatus according to claim 10, wherein the programming instructions instruct the at least one processor to:

supplement the beam domain signal with a target beam signal to obtain an updated beam domain signal, wherein the target beam signal is a signal received by n supplementary beams in a preset fixed direction, or wherein the target beam signal is a signal received by n directional supplementary beams that are predicted based on a multipath direction of a user channel and a moving direction, and n is a positive integer.

17. The apparatus according to claim 16, wherein the programming instructions instruct the at least one processor to:

determine a quantity of supplementary beams based on the channel information of the UE or a priority of the UE.

18. The apparatus according to claim 10, wherein the programming instructions instruct the at least one processor to:

adjust a data bit width of the eCPRI based on a preset measurement value; and transmit the beam domain signal to the RCC by using the eCPRI.

19. The apparatus according to claim 18, wherein the programming instructions instruct the at least one processor to:

transmit, to the RCC by using the eCPRI, the beam domain signal in a bandwidth scheduled for a user.

* * * * *